United States Patent
Kubota et al.

(10) Patent No.: US 9,716,598 B2
(45) Date of Patent: Jul. 25, 2017

(54) INFORMATION PROCESSING DEVICE TO PREVENT INFORMATION FROM BEING LEAKED OUT

(75) Inventors: Akira Kubota, Kahoku (JP); Yuuichi Komuro, Kahoku (JP)

(73) Assignee: PFU LIMITED, Ishikawa (JP)

( * ) Notice: Subject to any disclaimer, the term of this patent is extended or adjusted under 35 U.S.C. 154(b) by 898 days.

(21) Appl. No.: 13/410,426

(22) Filed: Mar. 2, 2012

(65) Prior Publication Data
US 2012/0284359 A1    Nov. 8, 2012

(30) Foreign Application Priority Data
May 6, 2011    (JP) .................................. 2011-103599

(51) Int. Cl.
G06F 15/16    (2006.01)
H04L 12/54    (2013.01)

(52) U.S. Cl.
CPC ................................ H04L 12/5692 (2013.01)

(58) Field of Classification Search
CPC .................................................. H04L 12/5692
USPC ........ 709/217, 201, 225, 231; 370/400, 401, 370/392
See application file for complete search history.

(56) References Cited

U.S. PATENT DOCUMENTS

| | | | | |
|---|---|---|---|---|
| 2004/0003103 A1* | 1/2004 | Witt | .................... | G06F 11/1464 709/231 |
| 2004/0243990 A1* | 12/2004 | Noda | .................... | G06K 1/128 717/154 |
| 2005/0036468 A1 | 2/2005 | Miyabayashi et al. | | |
| 2006/0159111 A1* | 7/2006 | Reed | ....................... | H04L 49/15 370/401 |
| 2006/0190642 A1* | 8/2006 | Aldereguia | ............. | G06F 11/24 710/60 |
| 2007/0019654 A1* | 1/2007 | Ha | ...................... | H04L 12/2602 370/400 |
| 2008/0071892 A1* | 3/2008 | Muro et al. | .................. | 709/221 |
| 2009/0089355 A1* | 4/2009 | Kudo | ..................... | G06K 15/02 709/201 |

(Continued)

FOREIGN PATENT DOCUMENTS

| | | | |
|---|---|---|---|
| JP | 2003-348655 A | 12/2003 | |
| JP | 2005-020477 A | 1/2005 | |

(Continued)

OTHER PUBLICATIONS

Japanese Office Action dated May 7, 2014, issued in corresponding Japanese Patent Application No. 2011-103599 (7 pages).

*Primary Examiner* — Thuong Nguyen
(74) *Attorney, Agent, or Firm* — Westerman, Hattori, Daniels & Adrian, LLP

(57) ABSTRACT

An information processing device according to one aspect of the present invention has a plurality of data transfer units and includes a data transfer monitoring unit to monitor whether or not a data transfer is executable by a first data transfer unit in the plurality of data transfer units and a data transfer inhibiting unit to inhibit, based on monitoring of the data transfer monitoring unit, the data transfer of a second data transfer unit different from the first data transfer unit in the plurality of data transfer units while the data transfer is executable by the first data transfer unit.

6 Claims, 4 Drawing Sheets

(56) References Cited

U.S. PATENT DOCUMENTS

| | | | | |
|---|---|---|---|---|
| 2011/0125824 | A1* | 5/2011 | Naruse | G06F 9/542 709/201 |
| 2011/0314088 | A1* | 12/2011 | Matzkel | H04L 63/0884 709/203 |
| 2011/0317700 | A1* | 12/2011 | Assarpour | H04L 12/4625 370/392 |

FOREIGN PATENT DOCUMENTS

| | | |
|---|---|---|
| JP | 2007-116509 A | 5/2007 |
| JP | 2007-256070 A | 10/2007 |
| JP | 2008-234410 A | 10/2008 |
| JP | 2009-232092 A | 10/2009 |

* cited by examiner

INFORMATION PROCESSING DEVICE TO PREVENT INFORMATION FROM BEING LEAKED OUT

CROSS-REFERENCE TO RELATED APPLICATIONS

This application is based upon and claims the benefit of priority of the prior Japanese Patent Application No. JP2011-103599, filed on May 6, 2011, the entire contents of which are incorporated herein by reference.

FIELD

The present invention relates to technologies of an information processing device, an information processing method and a program.

BACKGROUND

Over the recent years, with higher-functionalization of information processing devices such as mobile phones and personal computers, the majority of information processing devices each include a plurality of units which transfer data (which will hereinafter be referred to as data transfer units) such as a communication unit for performing wireless communications and a wired communication unit using a LAN cable.

For example, there is known a technology by which two communication units, i.e., a first communication unit and a second communication unit transfer and receive data (Japanese Patent Application Laid-Open Publication No. 2005-020477). Further, e.g., there is known a technology for preventing redundancy of an authenticating operation between two systems by transmitting and receiving authentication information between an authentication center held by a mobile network operator and an authentication server of a wireless LAN system (Japanese Patent Application Laid-Open Publication No. 2003-348655).

The prior arts, however, actively utilize the plurality of data transfer units in the information processing device. Therefore, for example, one of the plurality of data transfer units is connected to a closed network such as an intra-office network, in which case such a problem could arise that information existing on the closed network is leaked to an external network due to connecting other data transfer units in the plurality of data transfer units to the external network.

SUMMARY

An information processing device according to one aspect of the present invention has a plurality of data transfer units and includes a data transfer monitoring unit to monitor whether or not a data transfer is executable by a first data transfer unit in the plurality of data transfer units and a data transfer inhibiting unit to inhibit, based on monitoring of the data transfer monitoring unit, the data transfer of a second data transfer unit different from the first data transfer unit in the plurality of data transfer units while the data transfer is executable by the first data transfer unit.

It should be noted that another mode of one aspect of the present invention may be an information processing method which realizes the respective configurations described above, may also be a program and may further be a recording medium on which such a program is recorded, which can be read by a computer, other devices and machines. Herein, the recording medium readable by the computer etc connotes a medium that accumulates information such as programs electrically, magnetically, optically, mechanically or by chemical action.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An embodiment (which will hereinafter be referred to as "the embodiment") according to one aspect of the present invention will hereinafter be described based on the drawings. In the following discussion, however, the embodiment is no more than an exemplification of the present invention in all respects but does not limit the scope of the present invention. It is a matter of course to make a variety of improvements and modifications without departure from the scope of the present invention. Namely, a tangible configuration corresponding to the embodiment may properly be adopted on the occasion of carrying out the present invention.

Note that data given in the embodiment is, though described in a natural language (English etc), more concretely, specified by computer-recognizable elements such as a quasi-language, commands, parameters and a machine language.

§1 Information Processing Device

An information processing device according to the embodiment will hereinafter be described by use of FIGS. 1A, 1B and 2.

Figure 1A:
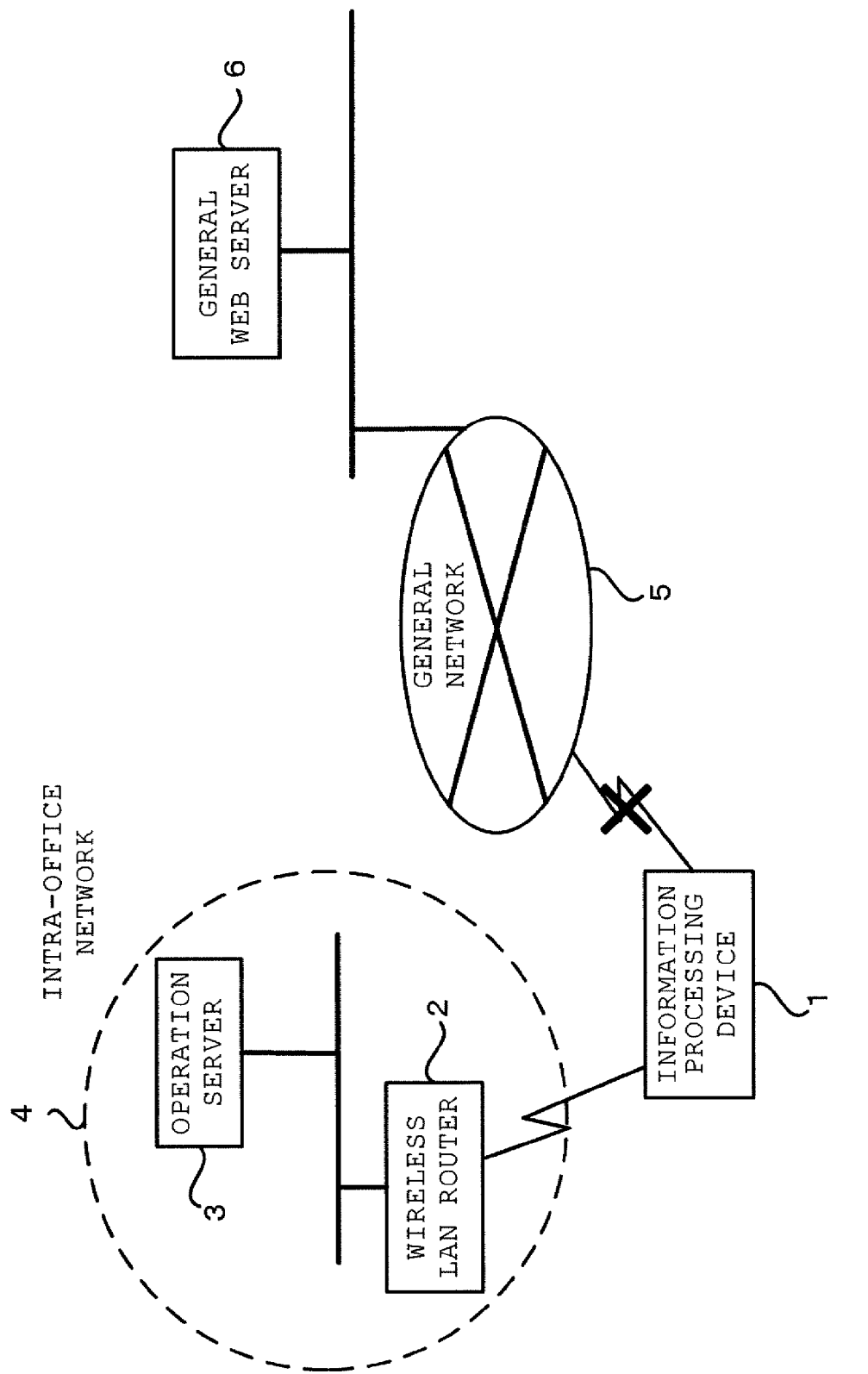
FIG. 1A illustrates an outline of a process of an information processing device according to an embodiment.
Figure 1B:
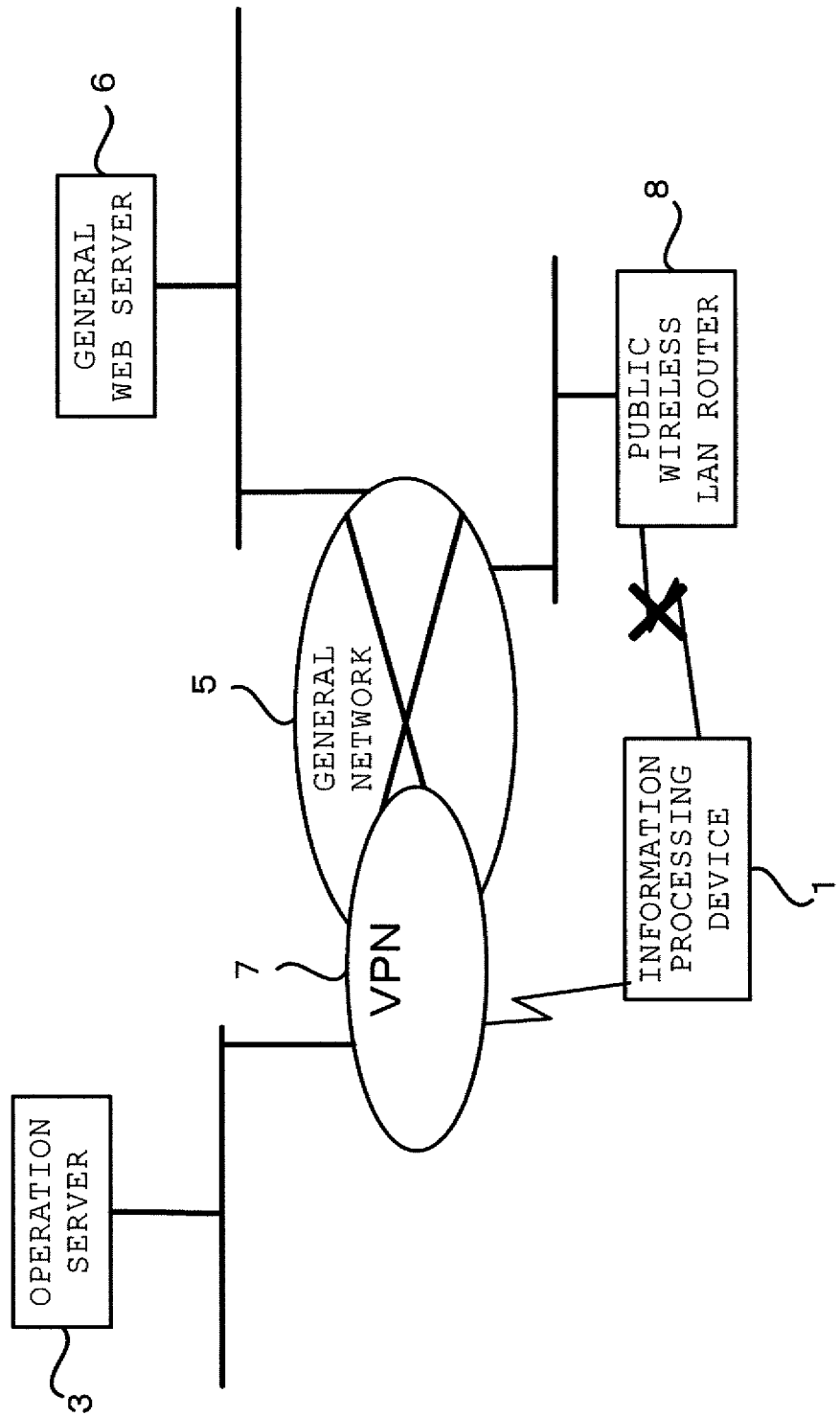
FIG. 1B illustrates the outline of the process of the information processing device according to the embodiment.

FIGS. 1A and 1B illustrate an operation of an information processing device 1 according to the embodiment. The information processing device 1 according to the embodiment includes a plurality of data transfer units. The data transfer unit is a unit which transmits and receives the data to and from other devices. The data transfer unit is a unit which transfers the data through, e.g., wireless LAN (Local Area Network) communications, 3G (3rd Generation) communications, communications via a LAN cable, a data transfer via a USB (Universal Serial Bus) and short-range wireless communications such as Bluetooth (registered trademark)) or IR (Infrared-Ray) communications. Note that the data transfer, which employ the same hardware but implement different protocols, may be treated as the data transfer conducted by different data transfer units. For example, in the 3G communications, the data transfer unit connecting with a VPN (Virtual Private Network) may be treated as the data transfer unit different from the data transfer unit connected to a general type of 3G network.

Further, e.g., in the wireless LAN communications, the data transfer unit based on SMTP (Simple Mail Transfer Protocol) may be treated as the data transfer unit different from the data transfer unit based on HTTP (HyperText Transfer Protocol).

The information processing device 1 according to the embodiment monitors whether the data transfer by a first data transfer unit in the plurality of data transfer units can be executed or not. During the first data transfer unit is enabled to transfer the data, the information processing device 1 according to the embodiment inhibits, based on this monitoring, the data transfer by a second data transfer unit different from the first data transfer unit in the plurality of data transfer units.

FIG. 1A illustrates an example in which the first data transfer unit is an intra-office wireless LAN communication unit for establishing a connection to an intra-office network 4 via a wireless LAN router 2. In this case, the information processing device 1 uses the first data transfer unit, thereby transferring and receiving the data to and from an operation server 3 existing on the intra-office network 4 via the wireless LAN router 2. The intra-office network 4 is a closed network separated from an external network. Then, an assumption is that data, which should not be leaked to the external network, is stored in the operation server 3.

In such a case, for instance, the information processing device 1 is to include the second data transfer unit defined as the communication unit for establishing a connection to a general network 5. The general network 5 is, e.g., a 3G network. Further, the second data transfer unit is, e.g., a 3G communication unit for establishing a connection to the 3G network. At this time, the information processing device 1, if connectable through the second data transfer unit to the general network 5, is enabled to perform the data transfer to the operation server 3 and a general Web server 6 existing on the general network 5, simultaneously. Namely, there is a possibility that information acquired from the operation server 3 might be leaked to the general Web server 6 via the information processing device 1. Therefore, the data, which is stored in the operation server 3 but should not be leaked to the external network, becomes data that can be acquired by the general Web server 6 existing on the general network 5. This reduces an effect in configuring the intra-office network 4 as the closed network.

Moreover, FIG. 1B illustrates a case in which the first data transfer unit is a communication unit for establishing a connection to a VPN 7. In the example illustrated in FIG. 1B, the second data transfer unit is a wireless LAN communication unit for establishing the connection to the general network 5 via a public wireless LAN router 8. The general network 5 is, e.g., the Internet. At this time, for example, supposing that the information processing device 1 is connectable through the second data transfer unit to the general network 5, similarly to the example depicted in FIG. 1A, there is the possibility that the information acquired from the operation server 3 might be leaked to the general Web server 6 via the information processing device 1. Then, the data, which is stored in the operation server 3 but should not be leaked to the external network, turns out to be the data that can be acquired by the general Web server 6 existing on the general network 5. This reduces an effect in connecting the information processing device 1 via the VPN 7 to the operation server 3.

The information processing device 1 according to the embodiment, in order to prevent situations such as these, while the data can be transferred by the first data transfer unit, inhibits the second data transfer unit from transferring the data.

Note that the information processing device 1 according to the embodiment includes, as the data transfer units, an intra-office wireless LAN communication unit for establishing the connection to the intra-office network 4, a public wireless LAN communication unit for establishing the connection to the general network 5, a general 3G communication unit for establishing the connection to the general network 5, and a VPN 3G communication unit for establishing the connection to the VPN 7, which are illustrated in FIGS. 1A and 1B.

Moreover, the information processing device 1 according to the embodiment includes, as will be described later on, a USB data transfer unit which transfers and receives the data to and from other devices via a USB (Universal Serial Bus).

Thus, the information processing device 1 according to the embodiment includes these five data transfer units. The data transfer units included in the information processing device according to the embodiment are not, however, limited to these data transfer units. For example, the information processing device according to the embodiment may include a communication unit via a LAN cable and a data transfer unit based on the short-range wireless communications such as Bluetooth (registered trademark)) or the IR communications.

It is to be noted that the intra-office network 4 according to the embodiment is an exemplification of the closed network. The intra-office network 4 may, however, be replaced by any type of network. The present invention does not limit the type of the network connected by the data transfer unit.

Further, the general network 5 according to the embodiment is exemplified by, e.g., a 3G network, the Internet, a telephone network such as ISDN (Integrated Service Digital Network), and a dedicated network. The general network 5 is properly selected corresponding to the data transfer unit of the information processing device 1.

Example of Configuration

Figure 2:
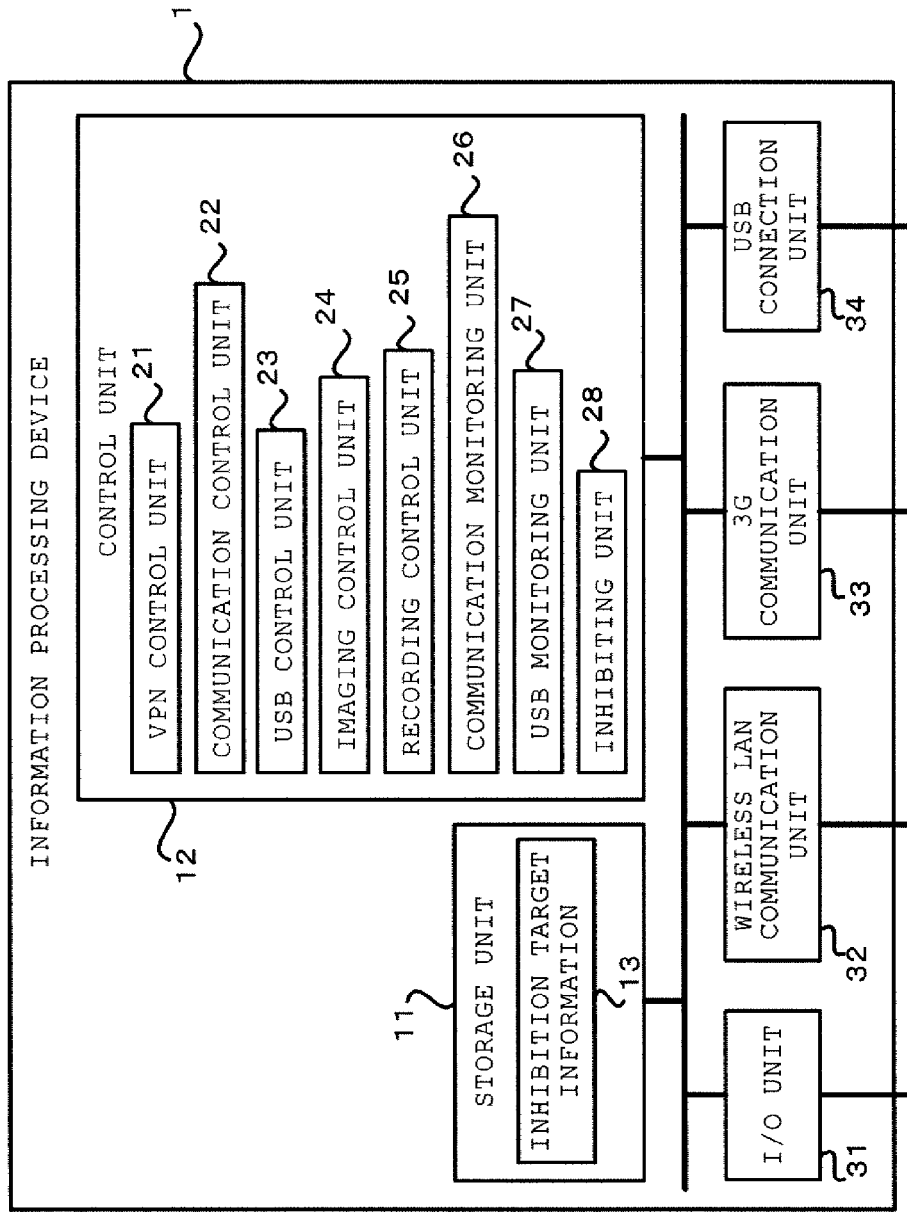
FIG. 2 illustrates a configuration of the information processing device according to the embodiment.

FIG. 2 depicts an example of a configuration of the information processing device 1 according to the embodiment. The information processing device 1 includes, as depicted in FIG. 2, as a hardware configuration (components), a storage unit 11, a control unit 12, an input/output (I/O) unit 31, a wireless LAN communication unit 32, a 3G communication unit 33, a USB connection unit 34, etc, which are connected to a bus.

Various categories of data and programs (unillustrated) used in processes executed by the control unit 12 are stored in the storage unit 11. The storage unit 11 is realized by, e.g., a storage device such as a hard disk and a flash memory.

Further, inhibition target information 13 is stored in the storage unit 11. The inhibition target information 13 contains definitions of targets of which functions are inhibited while the data transfer is executable by the first data transfer unit. The targets, of which the functions are inhibited during the period for which the data transfer is executable by the first data transfer unit, are, e.g., the programs stored in the data transfer unit and in the storage unit 11 and programs that are to be newly added to the storage unit 11.

The control unit 12 includes a single or a plurality of processors such as a microprocessor or a CPU (Central Processing Unit) and peripheral circuits (ROM (Read Only Memory), a RAM (Random Access Memory), an interface circuit, etc) used in the processes of the processor. The control unit 12 executes the variety of data and programs stored in the storage unit 11, thereby realizing the processes of the information processing device 1 in the embodiment. The ROM, the RAM, etc may be called main storage devices in the sense that these memories are disposed in an address space handled by the processor within the control unit 12.

The I/O unit 31 is a single or a plurality of interfaces for transferring and receiving the data to and from devices existing outside the information processing device 1. The I/O unit 31 is the interface etc for connecting with a user interface of, e.g., an input/output device.

The I/O unit 31 may be connected, e.g., an imaging device including an optical sensor or a microphone including a sensor which converts sounds into electric signals. Moreover, the I/O unit 31 may also be connected to an unillustrated user interface (I/O device such as touch panel, ten-key, keyboard, mouse and display).

The wireless LAN communication unit 32 is an interface for transferring and receiving the data to and from other devices by use of the wireless communications. The 3G communication unit 33 is an interface for transferring and receiving the data to and from other devices by use of the 3G communications. The USB connection unit 34 is an interface for establishing a USB-connection with an external device. The external device is, e.g., a recording medium such as a USB memory.

The processes of the information processing device 1 according to the embodiment are realized as the processes of the control unit 12. As illustrated in FIG. 2, the control unit 12 includes, a VPN control unit 21, a communication control unit 22, a USB control unit 23, an imaging control unit 24, a recording control unit 25, a communication monitoring unit 26, a USB monitoring unit 27 and an inhibiting unit 28. The VPN control unit 21, the communication control unit 22, the USB control unit 23, the imaging control unit 24, the recording control unit 25, the communication monitoring unit 26, the USB monitoring unit 27 and the inhibiting unit 28 are realized in such a way that the programs etc stored in the storage unit 11 are deployed on, e.g., the RAM etc defined as the peripheral circuit of the control unit 12 and executed by the processor of the control unit 12.

At least, the VPN control unit 21 controls the VPN connection in the 3G communications performed by the 3G communication unit 33. The communication control unit 22 controls the communications performed by the wireless LAN communication unit 32 and the 3G communication unit 33. To be specific, the communication control unit 22 switches over validity and invalidity of the communications performed by the wireless LAN communication unit 32 and the 3G communication unit 33, sets up as to whether VPN connections is established in the 3G communications or not, and executes a process of transferring the data via the wireless LAN communication unit 32 and the 3G communication unit 33. Then, the communication control unit 22 sets up to execute the VPN connection in the 3G communications, in which case the VPN control unit 21 implements the process of setting up the VPN connection in the 3G communications.

Namely, the communication control unit 22 controls the wireless LAN communication unit 32, thereby realizing an intra-office wireless LAN communication unit for establishing the connection to the intra-office network 4 and a public wireless LAN communication unit for establishing the connection to the general network 5. Further, a general 3G communication unit for establishing the connection to the general network 5 is realized in such a way that the 3G communication unit 33 is controlled by the communication control unit 22. Still further, a VPN communication unit for establishing the connection to the VPN 7 is realized in such a way that the 3G communication unit 33 is controlled by the VPN control unit 21 and the communication control unit 22.

The USB control unit 23 controls the transfer and the reception of the data between the device such as the USB memory connected to the USB connection unit 34 and the information processing device 1. Namely, the USB data transfer unit, which is one of the data transfer units included in the information processing device 1 in the embodiment and transfers and receives the data to and from other devices via the USB, is realized in the way of the USB connection unit 34 being controlled by the USB control unit 23.

The imaging control unit 24 controls the imaging device (unillustrated) including the optical sensor, whereby the imaging device performs imaging. Further, the recording control unit 25 controls the microphone (unillustrated) including the sensor which converts the sounds into the electric signals, whereby the microphone performs recording. The imaging device and the microphone may be connected to, e.g., the I/O unit 31 or the USB connection unit 34. Moreover, the imaging device and the microphone may be configured as portions of the information processing device 1.

The communication monitoring unit 26 monitors the validity and the invalidity of the communications performed by the wireless LAN communication unit 32 and the 3G communication unit 33. Note that, in the embodiment, the communication monitoring unit 26 monitors the validity and the invalidity of the communications performed by the 3G communication unit 33 in a way that distinguishes between the established VPN connection and the non-established VPN connection in the 3G communications of at least the 3G communication unit 33. The communication monitoring unit 26 monitors the validity and the invalidity of the communications performed by the wireless LAN communication unit 32 by making the distinction between connected points in the wireless LAN. To be specific, the communication monitoring unit 26 distinguishes between the intra-office wireless LAN communication unit, the public wireless LAN communication unit, the general 3G communication unit and the VPN 3G communication unit each realized in the way of the wireless LAN communication unit 32 and the 3G communication unit 33 being controlled by the VPN control unit 21 and the communication control unit 22, and thus monitors whether the data transfer is executable by these communication units or not.

The USB monitoring unit 27 monitors the validity and the invalidity of transferring and receiving the data between the device such as the USB memory connected to the USB connection unit 34 and the information processing device 1. Namely, the USB monitoring unit 27 monitors whether or not the data transfer is executable by the USB data transfer unit realized in the way of the USB connection unit 34 being controlled by the USB control unit 23.

During the data transfer is executable by the first data transfer unit, the inhibiting unit 28 inhibits, based on how the communication monitoring unit 26 and the USB monitoring unit 27 monitor the data transfer unit, the data transfer of the second data transfer unit different from the first data transfer unit. For example, in the example illustrated in FIG. 1A, the first data transfer unit is the intra-office wireless LAN communication unit for establishing the connection to the intra-office network 4, in which case the second data transfer unit inhibited by the inhibiting unit 28 from transferring the data is the 3G communication unit for establishing the connection to the general network 5.

Note that the inhibiting unit 28 according to the embodiment inhibits, while the data transfer is executable by the first data transfer unit, at least one of the imaging controlled by the imaging control unit 24 and the recording controlled by the recording control unit 25. Moreover, the inhibiting unit 28 according to the embodiment refers to the inhibition target information 13 in order to specify these inhibition targets. Further, the inhibiting unit 28 according to the embodiment inhibits, while the data transfer is executable by the first data transfer unit, execution of a program specified by the inhibition target information 13 and stored in the storage unit 11. Then, the inhibiting unit 28 according to the embodiment inhibits, while the data transfer is executable by the first data transfer unit, the program specified by the inhibition target information 13 from being newly added to the storage unit 11.

There may be a plurality of second data transfer units, which are inhibited by the inhibiting unit 28 from transferring the data. Furthermore, if the inhibition target is set or specified beforehand, the inhibiting unit 28 may not refer to the inhibition target information 13. That is to say, the inhibiting unit 28 may inhibit, without referring to the inhibition target information 13, the data transfer of the preset or pre-specified second data transfer unit.

Note that the communication monitoring unit 26 and the USB monitoring unit 27 correspond to a data transfer monitoring unit according to one aspect of the present invention. The inhibiting unit 28 corresponds to a data inhibiting unit, a surrounding information acquisition inhibiting unit, a program execution inhibiting unit and a program addition inhibiting unit according to one aspect of the present invention. The imaging control unit 24 and the recording control unit 25 correspond to a surrounding information acquiring unit according to one aspect of the present invention. The storage unit 11 corresponds to an inhibition target information storage unit and a program storage unit according to one aspect of the present invention.

The information processing device 1 according to the embodiment is a device including these configurations. The information processing device 1 is exemplified by, e.g., a mobile terminal such as a smartphone and a general-purpose computer such as a PC (Personal Computer).

§2 Operational Example

Figure 3:
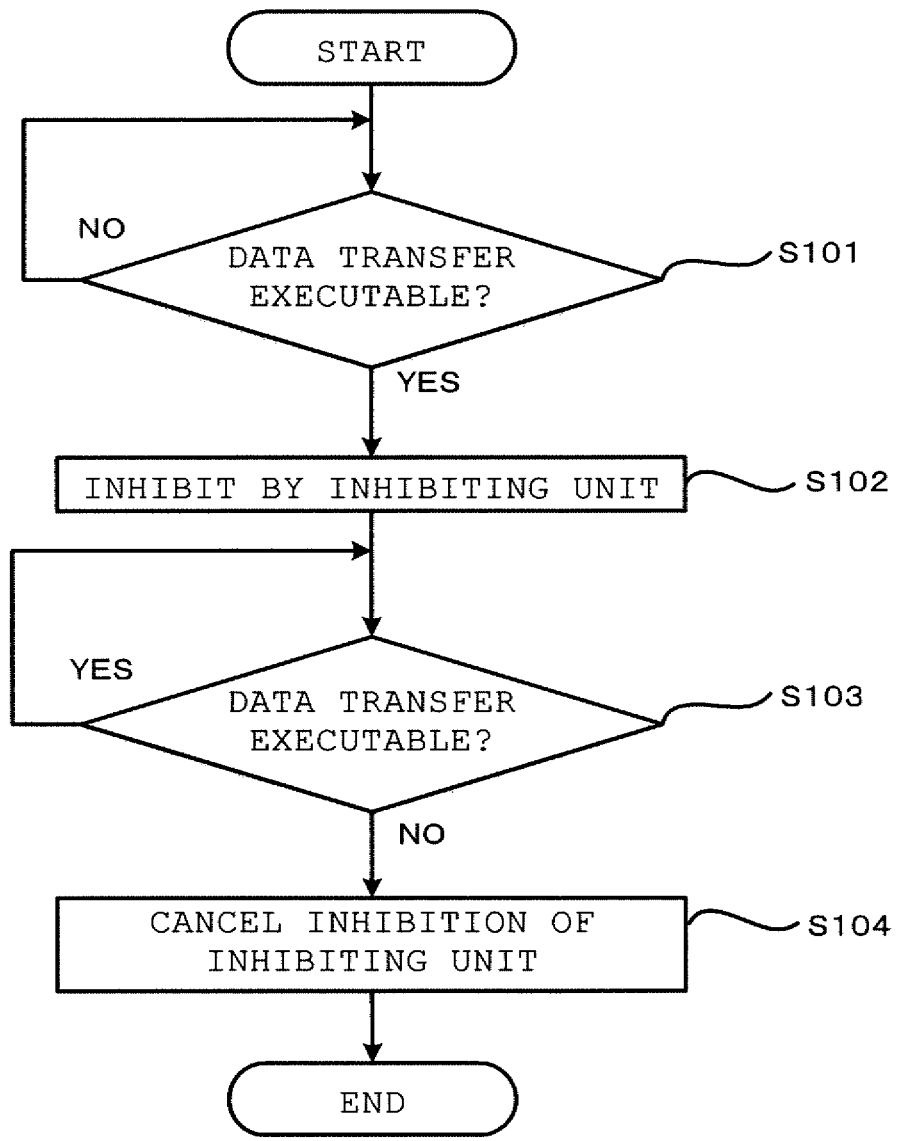
FIG. 3 is a flowchart depicting one example of a processing procedure of the information processing device according to the embodiment.

Next, an operational example of the information processing device 1 according to the embodiment will be described by use of FIG. 3. FIG. 3 illustrates one example of a processing procedure of the information processing device 1 according to the embodiment. Note that "step" is abbreviated to "S" in FIG. 3. Incidentally, in the following discussion, in the case of describing the processes based on respective functions realized by the control unit 12, the description proceeds on the assumption that each function block is an entity of the process.

<Start>

To start with, for instance, in response to a user's operation, the program stored in the storage unit 11 is deployed on the RAM etc of the control unit 12. Then, the program deployed on the RAM etc of the control unit 12 is executed by the processor of the control unit 12. Thus, the information processing device 1 starts the process.

<Step 101>

In step 101, it is monitored and determined whether the data transfer is executable by each data transfer unit or not.

The data transfer units, which are eligible for the monitoring and determining target as to whether executable or not, are the intra-office wireless LAN communication unit, the public wireless LAN communication unit, the general 3G communication unit, the VPN 3G communication unit and the USB data transfer unit in the embodiment. These data transfer units are, as described above, realized in such a way that the VPN control unit 21, the communication control unit 22 and the USB control unit 23 control the wireless LAN communication unit 32, the 3G communication unit 33 and the USB connection unit 34. The communication monitoring unit 26 monitors and determines whether or not the data transfer is executable by the intra-office wireless LAN communication unit, the public wireless LAN communication unit, the general 3G communication unit and the VPN 3G communication unit. Moreover, the USB monitoring unit monitors and determines whether the data transfer is executable by the USB data transfer unit or not. It should be noted that the data transfer unit monitored in step 101 corresponds to a first data transfer unit according to one aspect of the present invention.

For example, the data transfer unit monitored in step 101 is assumed to be the intra-office wireless LAN communication unit for establishing the connection to the intra-office network 4.

In this case, the communication monitoring unit 26 monitors the operation of the wireless LAN communication unit 32, thereby detecting that the wireless communication of the wireless LAN communication unit 32 is started or validated. For instance, the communication monitoring unit 26 monitors the processes being processed in the information processing device 1. Subsequently, the communication monitoring unit 26 determines whether or not the monitored processes contain a process related to the wireless communication of the wireless LAN communication unit 32. Then, at a point of time when determining that there exists the process pertaining to the wireless communication of the wireless LAN communication unit 32, the communication monitoring unit 26 detects that the wireless communication of the wireless LAN communication unit 32 is started or validated.

Upon detecting that the wireless communication of the wireless LAN communication unit 32 is started or validated, the communication monitoring unit 26 determines whether the connected point of the wireless communication of the wireless LAN communication unit 32 is the intra-office network 4 or not. In this determination, when determining that the connected point of the wireless communication of the wireless LAN communication unit 32 is the intra-office network 4, the communication monitoring unit 26 further determines that the data transfer based on the intra-office wireless LAN communication unit for establishing the connection to the intra-office network 4 is executable, and advances the processing to next step 102.

Note that the communication monitoring unit 26 may determine the connected point of the wireless communication of the wireless LAN communication unit 32 by a variety of methods.

For example, the communication monitoring unit 26 may determine the connected point of the wireless communication by referring to SSID (Service Set Identifier) used for the wireless communication of the wireless LAN communication unit 32.

Furthermore, it is assumed that the control unit 12 includes a GPS receiving unit which deduces positional information by receiving radio waves transmitted from, e.g., a GPS (Global Positioning System) satellite. In this case, the communication monitoring unit 26 may determine the connected point of the wireless communication of the wireless LAN communication unit 32 by determining whether the position indicated by the positional information acquired by the GPS receiving unit is within the office or not.

Further, it is assumed that the control unit 12 includes, e.g., a radio wave measuring unit which measures an intensity of the radio waves received from the wireless LAN router 2 for establishing the connection to the intra-office network 4. In this case, the communication monitoring unit 26 may determine the connected point of the wireless communication of the wireless LAN communication unit 32 by determining whether the intensity of the radio waves exceeds a setting-enabled and changeable threshold value or not.

Note that if the public wireless LAN communication unit for establishing the connection to the general network 5 is the monitoring/determining target in step 101, the description is made similarly to the case in which the intra-office wireless LAN communication unit is the monitoring/determining target in step 101. Namely, the communication monitoring unit 26 monitors the operation of the wireless LAN communication unit 32, thereby detecting that the wireless communication of the wireless LAN communication unit 32 is started or validated. Then, upon detecting that the wireless communication of the wireless LAN communication unit 32 is started or validated, the communication monitoring unit 26 determines whether the connected point of the wireless communication of the wireless LAN communication unit 32 is the general network 5 or not. In this determination, when determining that the connected point of the wireless communication of the wireless LAN communication unit 32 is the general network 5, the communication monitoring unit 26 further determines that the data transfer based on the intra-office wireless LAN communication unit is executable, and advances the processing to next step 102. It is to be noted that the method of determining that wireless communication of the wireless LAN communication unit 32 is started or validated and the method of determining the connected point of the wireless communication of the wireless LAN communication unit 32, are as described above. At this time, the communication monitoring unit 26, if determining that the connected point of the wireless communication of the wireless LAN communication unit 32 is not the intra-office network 4, may determine that the connected point of the wireless communication of the wireless LAN communication unit 32 is the general network 5.

Further, for instance, it is assumed that the data transfer unit monitored in step 101 is the general 3G communication unit for establishing the connection to the general network 5. In this case, the communication monitoring unit 26 monitors the operation of the 3G communication unit 33, thereby determining whether or not the 3G communication of the 3G communication unit 33 is started or valid. For example, the communication monitoring unit 26 monitors the processes being processed in the information processing device 1. Subsequently, the communication monitoring unit 26 determines whether or not the processes being monitored contain a process pertaining to the 3G communication of the 3G communication unit 33. Then, at a point of time when determining that there exists the process pertaining to the 3G communication of the 3G communication unit 33, the communication monitoring unit 26 recognizes that the 3G communication of the 3G communication unit 33 is started or valid.

Then, upon determining that the 3G communication of the 3G communication unit 33 is started or valid, the communication monitoring unit 26 determines whether the connected point of the 3G communication of the 3G communication unit 33 is the VPN 7 or not. As a result of the determination, when determining that the connected point of the 3G communication of the 3G communication unit 33 is not the VPN 7, the communication monitoring unit 26 determines that the data transfer of the general 3G communication unit 33 is executable, and advances the processing to next step 102.

Note that the communication monitoring unit 26 may determine by the variety of methods whether the connected point of the 3G communication of the 3G communication unit 33 is the VPN 7 or not.

For instance, the communication monitoring unit 26 may determine whether or not the connected point of the 3G communication is the VPN 7 by determining whether a process of a user authentication in the VPN is executed or not. The process of the user authentication connotes a process conducted for the user authentication made in order to establish the VPN connection, a process of transmitting and receiving data on an authentication screen to be displayed on the display device (unillustrated) connecting with the information processing device 1 and a process of the authentication based on an authentication protocol, etc.

Further, for example, the communication monitoring unit 26 may determine whether or not the connected point of the 3G communication is the VPN 7 by determining whether a program for the VPN connection implemented in the information processing device 1 is executed or not. It is to be noted that the implementation of the program can be specified by referring to a name etc of the process being executed.

Moreover, e.g., the communication monitoring unit 26 may determine whether or not the connected point of the 3G communication is the VPN 7 by determining whether or not the communication with the server (e.g., the operation server 3) not enabled to connect with the general network 5 but enabled to connect with the VPN 7 can be performed. Incidentally, it can be determined whether or not the communication with the server not enable to connect with the general network 5 but enabled to connect with the VPN 7 can be performed in a way that refers to, e.g., DNS (Domain Name System) of the server, transmits "ping" to the server and determines whether connectable to the server or not.

Note that if the VPN 3G communication unit for establishing the connection to the VPN 7 is the monitoring/determining target in step 101, the description is made similarly to the case where the general 3G communication unit stated above is the monitoring/determining target in step 101. Namely, the communication monitoring unit 26 monitors the operation of the 3G communication unit 33, thereby determining whether or not the 3G communication of the 3G communication unit 33 is started or valid. Then, if it is determined that the 3G communication of the 3G communication unit 33 is started or valid, the communication monitoring unit 26 determines whether or not the connected point of the 3G communication of the 3G communication unit 33 is VPN 7. As a result of the determination, when determining that the connected point of the 3G communication of the 3G communication unit 33 is VPN 7, the communication monitoring unit 26 determines that the data transfer based on the general 3G communication unit is executable, and advances the processing to next step 102. Note that the determination as to whether the 3G communication of the 3G communication unit 33 is started or valid and the determination as to whether or not the connected point of the 3G communication of the 3G communication unit 33 is VPN 7, are as described above.

Moreover, an assumption is that the data transfer unit monitored in step 101 is, e.g., the USB data transfer unit which transfers and receives the data to and from other devices via the USB. In this case, the USB monitoring unit 27 monitors the operation of the USB connection unit 34, thereby determining whether the data transfer of the USB data transfer unit is executable or not. The USB monitoring unit 27 determines whether or not the data transfer of the USB data transfer unit is executable in a way that determines whether or not the storage medium etc such as the USB memory is effectively connected to the USB connection unit 34 or determines whether or not the transfer of test data via the USB connection unit 34 is executable. Note that the status of the storage medium etc being effectively connected to the USB connection unit 34 indicates a status of the storage medium being recognized in the information processing device 1, and so on. Further, the test data is data for determining whether the data transfer is executable or not, and may also be any type of data.

Incidentally, any one of the data transfer units may be monitored in step 101. Further, some of the data transfer units may also be monitored in step 101.

Note that if it is not determined that the data transfer of the data transfer unit set as the monitoring/determining target in step 101 is executable ("NO" in S101), the processing is looped back to iterate step 101. For example, the monitoring/determining target in step 101 is assumed to be the intra-office wireless LAN communication unit. In this case, e.g., if neither the start nor the validity of the wireless communication of the wireless LAN communication unit 32 is detected, it is not determined that the data transfer of the intra-office wireless LAN communication unit is executable. In such a case, step 101 is repeated.

<Step 102>

In step 102, the inhibiting unit 28 inhibits the data transfer of the data transfer unit different from the data transfer unit of which the data transfer is determined to be executable in step 101. In the embodiment, the inhibiting unit 28 inhibits the data transfer of the data transfer unit by referring to the inhibition target information 13, and advances the processing to next step 103. The data transfer unit, which is inhibited from transferring the data in step 102, corresponds to the second data transfer unit according to one aspect of the present invention.

For example, if the intra-office wireless LAN communication unit is the data transfer unit of which the data transfer is determined to be executable in step 101, the inhibiting unit 28 inhibits the general 3G communication unit, the VPN 3G communication unit and the USB data transfer unit from transferring the data. In other words, the inhibiting unit 28 inhibits the 3G communication unit 33 and the USB connection unit 34 from transferring the data.

Further, e.g., if the public wireless LAN communication unit is the data transfer unit of which the data transfer is determined to be executable in step 101, the inhibiting unit 28 inhibits the VPN 3G communication unit and the USB data transfer unit from conducting the data transfer. In other words, the inhibiting unit 28 inhibits the VPN control unit 21 from establishing the VPN connection and the USB connection unit 34 from performing the data transfer.

Furthermore, for instance, if the VPN 3G communication unit is the data transfer unit of which the data transfer is determined to be executable, the inhibiting unit 28 inhibits the intra-office wireless LAN communication unit, the public wireless LAN communication unit and the USB data transfer unit from performing the data transfer. In other words, the inhibiting unit 28 inhibits the wireless LAN communication unit 32 and the USB connection unit 34 from conducting the data transfer.

Moreover, for instance, if the USB data transfer unit is the data transfer unit of which the data transfer is determined to be executable, the inhibiting unit 28 inhibits the intra-office wireless LAN communication unit, the public wireless LAN communication unit, the general 3G communication unit and the VPN 3G communication unit from performing the data transfer. In other words, the inhibiting unit 28 inhibits the wireless LAN communication unit 32 and the 3G communication unit 33 from conducting the data transfer.

Thus, the inhibiting unit 28 inhibits the data transfer of the data transfer unit different from the data transfer unit of which the data transfer is determined to be executable in step 101. Note that the data transfer of the each data transfer unit is inhibited by the variety of methods. In the following description of the method of inhibiting the data transfer, each of the wireless LAN communication unit 32, the 3G communication unit 33 and the USB connection unit 34 is referred to also as "each data transfer unit".

For example, the inhibiting unit 28 invalidates a device of each data transfer unit by rewriting a value in a control register of the device corresponding to each data transfer unit, thereby inhibiting the data transfer of each data transfer unit. Note that the device operation such as this may be realized by making use of, e.g., the function of the operating system (OS).

Moreover, e.g., the inhibiting unit 28 disables implementation of each function of the device corresponding to each data transfer unit by rewriting a function pointer that points out each function (Function) of the device corresponding to each data transfer unit, thereby inhibiting each data transfer unit from the data transfer. The inhibiting unit 28 replaces the function indicated by the function pointer which points out each function (Function) of the device corresponding to each data transfer unit with a function with an error indication value serving as a return value, thereby disabling the implementation of each function of the device corresponding to each data transfer unit.

Further, for instance, the inhibiting unit 28 inhibits each data transfer unit from the data transfer by rewriting control information or table information of the device corresponding to each data transfer unit with the result that the device is disabled from functioning. The control information or the table information of the device is rewritten, whereby, e.g., the wireless LAN communication unit 32 is disabled from executing the search for the wireless LAN as the connected point. Moreover, the rewriting gets, e.g., a communication encryption system masqueraded, whereby the wireless LAN communication unit 32 and the 3G communication unit 33 can not be connected to the intra-office network 4. For instance, the encryption system in the intra-office network 4 is to be a DES (Data Encryption Standard) encryption. At this time, an RSA (Rivest Shamir Adleman) encryption defined as the encryption system different from the DES encryption masquerades as the encryption system of the wireless communications, whereby the wireless LAN communication unit can not be connected to the intra-office network 4. Furthermore, the rewriting gets, e.g., a communication protocol masqueraded, with the result that the neither the wireless LAN communication unit 32 nor the 3G communication unit 33 connects with the intra-office network 4. For example, the intra-office network 4 is to accept only the communications based on SSH (Secure Shell). At this time, a communication protocol different from SSH masquerades as the communication protocol of the wireless communications, thereby disabling the wireless LAN communication unit 32 from executing the SSH-based wireless communications and from connecting with the intra-office network 4. Further, with the rewriting, e.g., an encryption key is broken, with the result that the wireless LAN communication unit 32 and the 3G communication unit 33 can not connect with the intra-office network 4. With these schemes, the data transfer of each data transfer unit is inhibited.

Further, for example, the inhibiting unit 28 inhibits each data transfer unit from the data transfer by rewriting a part or the whole of the data related to the data transfer of each data transfer unit.

The data transferred and received by the wireless LAN communication unit 32 and the 3G communication unit 33 are, e.g., packets. The inhibiting unit 28 intercepts, e.g., a communication packet and rewrites a part of the packet, thereby inhibiting the packet from being transmitted in a way that gets a destination IP address or a port number contained in the packet masqueraded. Further, for instance, the inhibiting unit 28 breaks the data of the packet, thereby invalidating the data transfer of each data transfer unit. Still further, e.g., the inhibiting unit 28 inhibits the transmission of the packet by not transmitting but discarding the packet.

As for the data transferred and received by the USB connection unit 34, for example, the inhibiting unit 28 inhibits the USB connection unit 34 from the data transfer by rewriting a part or the whole of the data so as to get a vendor name, a model ID or a device ID of the device driver masqueraded. Further, the inhibiting unit 28 inhibits the USB connection unit 34 from the data transfer by breaking the data. Still further, the inhibiting unit 28 inhibits the USB connection unit 34 from the data transfer by discarding the data and returning the error indication value. At this time, the inhibiting unit 28 may not inhibit the functions other than the data transfer performed between the USB connection unit 34 and the device connected to the USB connection unit 34. For example, the device connected to the USB connection unit 34 is charged with the electric current obtained via the USB connection unit 34, in which case the inhibiting unit 28 may not inhibit charging.

Moreover, e.g., the inhibiting unit 28 invalidates the operation of the VPN control unit 21, thereby inhibiting the VPN 3G communication unit from the data transfer. For instance, the inhibiting unit 28 inhibits the VPN control unit 21 from executing the setting process of the VPN connection. The 3G communication unit 33 is thereby disabled from connecting with VPN 7, thus inhibiting the VPN 3G communication unit from the data transfer.

Note that the inhibiting unit 28 specifies these data transfer inhibition targets by referring to the inhibition target information 13. The inhibition target information 13 defines the targets to be inhibited in step 102 with respect to the data transfer units that are monitored and determined as to whether the data transfer is executable or not in step 101. Namely, if there is the plurality of data transfer units that is monitored and determined as to whether the data transfer is executable or not, the inhibition target information 13 defines the targets to be inhibited in step 102 for every plurality of data transfer units as the monitoring/determining targets.

Furthermore, the inhibition target information 13 according to the embodiment defines function-inhibited targets, i.e., the imaging device of which the imaging operation is controlled by the imaging control unit 24 and the microphone of which the recording operation is controlled by the recording control unit 25. Therefore, the inhibiting unit 28 according to the embodiment inhibits the imaging device from imaging and the microphone from recording. It is to be noted that the inhibition of these targets is realized by the same method as inhibiting the USB connection unit 34 etc from the data transfer.

Yet further, the inhibition target information 13 according to the embodiment defines the program inhibited from being executed while the data transfer is executable by the first data transfer unit. Hence, the inhibiting unit 28 according to the embodiment inhibits the execution of the program defined in the inhibition target information 13 by referring to inhibition target information 13. For example, the inhibiting unit 28 monitors a process name of the program related to the execution. Then, in the case of detecting the program that is inhibited from its execution by monitoring the process name, the inhibiting unit 28 inhibits the program from being executed in a way that stops the execution of the program.

Moreover, the inhibition target information 13 according to the embodiment defines the program inhibited from being newly added while the data transfer is executable by the first data transfer unit. Therefore, the inhibiting unit 28 according to the embodiment refers to the inhibition target information 13 and thus inhibits the program defined in the inhibition target information 13 from being stored in the storage unit 11. For example, the inhibiting unit 28 monitors the program to be installed. Then, as a result of monitoring, in the case of detecting the installation of the program defined in the inhibition target information 13, the inhibiting unit 28 inhibits the program from being stored in the storage unit 11 by stopping the installing process, and so on.

<Step 103>

In step 103, it is again determined whether or not the data transfer is executable by the data transfer unit that has been the monitoring/determining target in step 101. Then, if the data transfer is determined not to be executable by the data transfer unit that has been the monitoring/determining target in step 101 ("NO" in S103), the processing proceeds to next step 104. Further, if the data transfer is determined to be executable by the data transfer unit that has been the monitoring/determining target in step 101 ("YES in S103), the processing is looped back to iterate step 103. Note that this operation is described similarly to step 101.

<Step 104>

In step 104, the inhibition by the inhibiting unit 28, which is carried out in step 102, is canceled.

For example, in step 102, the inhibiting unit 28 inhibits each data transfer unit from the data transfer by rewriting the value in the control register of the device corresponding to each data transfer unit. At this time, in step 104, the inhibiting unit 28 cancels the inhibition of the data transfer by returning the value in the control register to the previous value (before being rewritten).

Moreover, e.g., in step 102, the inhibiting unit 28 inhibits each data transfer unit from the data transfer by rewriting the function pointer which points out each function (Function) of the device corresponding to each data transfer unit. At this time, in step 104, the inhibiting unit 28 cancels the inhibition of the data transfer by returning the function pointer to the previous status before being rewritten.

Furthermore, e.g., in step 102, the inhibiting unit 28 inhibits each data transfer unit from the data transfer by rewriting the control information or the table information of the device corresponding to each data transfer unit. At this time, in step 104, the inhibiting unit 28 cancels the inhibition of the data transfer by returning the rewritten control information or table information to the previous status before being rewritten.

Further, for instance, in step 102, the inhibiting unit 28 inhibits each data transfer unit from the data transfer by rewriting a part or the whole of the data related to the data transfer by each data transfer unit. At this time, in step 104, the inhibiting unit 28 cancels the inhibition of the data transfer by stopping rewriting a part or the whole of the data.

Still further, e.g., in step 102, the inhibiting unit 28 inhibits the VPN 3G communication unit from the data transfer by inhibiting the VPN control unit 21 from executing the setting process of the VPN connection. At this time, in step 104, the inhibiting unit 28 cancels the inhibition of the data transfer by the VPN 3G communication unit by stopping inhibiting the VPN control unit 21 from executing the setting process of the VPN connection.

Yet further, e.g., in step 102, the inhibiting unit 28 inhibits the imaging device from imaging and the microphone from recording. At this time, in step 104, the inhibiting unit 28 cancels inhibiting the imaging device from imaging and the microphone from recording. Note that the canceling method is the same as the method pertaining to the USB connection unit 34 etc.

Moreover, for instance, in step 102, the inhibiting unit 28 inhibits the execution of the program defined in the inhibition target information 13. For example, the inhibiting unit 28 inhibits the execution of the program by monitoring the process name of the program related to the execution and stopping the execution of the inhibition target program. At this time, in step 104, the inhibiting unit 28 cancels the inhibition of the execution of the program by stopping the execution of the monitoring/stopping process of the program.

Furthermore, e.g., in step 102, the inhibiting unit 28 inhibits the program defined in the inhibition target information 13 from being stored in the storage unit 11. For example, the inhibiting unit 28 inhibits the program defined in the inhibition target information 13 from being stored in the storage unit 11 by monitoring the program to be installed and stopping the execution of installing the inhibition target program. At this time, in step 104, the inhibiting unit 28 cancels inhibiting the program defined in the inhibition target information 13 from being stored in the storage unit 11 by stopping the execution of the monitoring/stopping process of the installation.

<End>

Then, the information processing device 1 finishes the processes according to the present operational example.

§3 Operation and Effect According to Embodiment

According to what has been discussed so far, in the information processing device 1 in accordance with the embodiment, it is monitored whether the data transfer is executable by the first data transfer unit or not (step 101). Then, in the case of determining based on the monitoring that the data transfer is executable by the first data transfer unit, the inhibiting unit 28 inhibits the data transfer of the second data transfer unit different from the first data transfer unit (step 102).

Therefore, according to the information processing device 1 of the embodiment, the second data transfer unit is inhibited from the data transfer while the data transfer is executable by the first data transfer unit. Consequently, according to the information processing device 1 of the embodiment, it is feasible to prevent the information from being leaked out due to such a cause that the data transfer is executable by the second data transfer unit while the data transfer is executable by the first data transfer unit.

Further, according to the information processing device 1 of the embodiment, while the data transfer is executable by the first data transfer unit, the imaging device controlled by the imaging control unit 24 is inhibited from imaging and the microphone controlled by the recording control unit 25 is inhibited from recording. With this scheme, there is inhibited the acquisition of the information (surrounding information) in the range where the information can be acquired by the imaging device and the microphone each connected to the information processing device 1. Hence, according to the information processing device 1 of the embodiment, it is possible to prevent the surrounding information from being leaked out. Incidentally, e.g., if the first data transfer unit is the intra-office wireless LAN communication unit, the surrounding information contains, for example, an image representing a scene in the office or a sound uttered in the office.

Moreover, in the information processing device 1 according to the embodiment, the inhibition target of the inhibiting unit 28 in step 102 is specified based on the inhibition target information 13. Therefore, in the information processing device 1 according to the embodiment, the target inhibited while the data transfer is executable by the first data transfer unit can be set and changed by a simple method. Furthermore, e.g., the information processing device 1 may update the inhibition target information 13 on the basis of the information acquired from the server via the network. With this update, a security policy or a quarantine policy related to the information processing device 1 can be set. Note that these operations may be carried out by way of a part of the quarantine process etc in the information processing device 1.

Still further, in the information processing device 1 according to the embodiment, in step 102, the inhibiting unit 28 inhibits the execution of the program defined in the inhibition target information 13. With this inhibition, in the information processing device 1 according to the embodiment, for instance, it is feasible to inhibit the execution of a program (e.g., a P2P (peer to peer) program) not suited to the execution. Further, the intra-office policy can be set by setting a program inhibited from being executed while the data transfer is executable by the intra-office wireless LAN communication unit.

Moreover, in the information processing device 1 according to the embodiment, in step 102, the inhibiting unit 28 inhibits the program defined in the inhibition target information 13 from being newly added to the storage unit 11 while the data transfer is executable by the first data transfer unit. With this inhibition, in the information processing device 1 according to the embodiment, for instance, the intra-office policy can be set by inhibiting the installation of the program not related to fulfillment of the operation.

§4 Supplement

The in-depth description of the embodiment of the present invention has been made so far, however, the description given above is no more than the exemplification of the present invention in any respects but does not limit the scope of the present invention. It is a matter of course that a variety of improvements and modifications can be made without deviating from the scope of the present invention.

For example, in the wireless LAN communications, the SMTP (Simple Mail Transfer Protocol)—based data transfer unit may be treated as the data transfer unit different from the HTTP (HyperText Transfer Protocol)—based data transfer unit. In this case, the data transfers about the respective functions such as an e-mail and a Web access are treated differently from each other. Therefore, the data transfer units are thus treated, whereby each of the data transfers by the same device can be specified as the data transfer inhibited on a per-function basis such as inhibiting only the data transfer about, e.g., the e-mail.

The present embodiment aims at preventing the leakage of the information that is to occur when the information processing device includes the plurality of data transfer units. Then, according to the embodiment, it is feasible to provide the technology capable of preventing the leakage of the information that is to occur when the information processing device includes the plurality of data transfer units.

What is claimed is:

1. An information processing device including a plurality of data transfer processors, comprising:
    a first data transfer processor configured to use a first data transmission path only;
    a second data transfer processor configured to use a second data transmission path only;
    a control processor configured to monitor whether or not a data transfer by the first data transfer processor is available in the plurality of data transfer processors;
    the control processor configured to inhibit, based on monitoring of the control processor, the data transfer of the second data transfer processor while the data transfer by the first data transfer path is available;
    a memory configured to store an additional program to be newly added; and
    the control processor configured to inhibit the additional program from being added to the memory while the data transfer by the first data transfer processor is available,
    wherein the first data transfer processor and the second data transfer processor are within the information processing device,
    wherein data is prevented from being leaked out from the first data transfer processor by inhibiting the data transfer while the data transfer by the second data transfer processor is available,
    wherein the control processor repeats monitoring until the data transfer by the first data transfer processor is available,
    wherein the control processor inhibits the data transfer of each data transfer processor by rewriting a value in a control register, a function pointer, control or table information of a device corresponding to each data transfer processor, or rewriting a part or the whole of the data related to the data transfer of each data transfer processor,
    wherein the control processor cancels the inhibition of the data transfer by returning the value in the control register to a previous value, by returning the function pointer to a previous status, or by rewriting the control information or the table information to the previous status,
    wherein the previous value is a value before being rewritten, and the previous status is a status before being rewritten,
    wherein an inhibition target information further defines the additional program inhibited from being added to the memory, and
    wherein the control processor inhibits the additional program from being added to the memory by referring to the inhibition target information.

2. The information processing device according to claim 1, further comprising:
    the control processor configured to acquire, by use of a sensor connected to the information processing device, information surrounding the sensor; and
    the control processor configured to inhibit the control processor from acquiring the information while the data transfer by the first data transfer processor is available.

3. The information processing device according to claim 1, further comprising:
    a memory configured to store inhibition target information which defines a target of which a function is inhibited while the data transfer by the first data transfer processor is available,
    wherein the inhibition target information defines the second data transfer processor as the target of which the function is inhibited, and
    the control processor refers to the inhibition target information and inhibits the second data transfer processor from the data transfer while the data transfer by the first data transfer processor is available.

4. The information processing device according to claim 3, further comprising, the inhibition target information further defining an execution-inhibition target program inhibited from being executed while the data transfer by the first data transfer processor is available,
    the control processor configured to inhibit the execution-inhibition target program from being executed while the data transfer by the first data transfer processor is available in a way that refers to the inhibition target information.

5. An information processing method by which a computer including a plurality of data transfer processors executes:
    using a first data transmission path by a first data transfer processor only;
    using a second data transmission path by a second transfer processor only;
    monitoring whether or not a data transfer by the first data transfer processor is available in the plurality of data transfer processors;
    inhibiting, based on monitoring, the data transfer of the second data transfer processor while the data transfer by the first data transfer path is available;
    storing an additional program to be newly added; and
    inhibiting the additional program from being added to a memory while the data transfer by the first data transfer processor is available,
    wherein the first data transfer processor and the second data transfer processor are within the computer,
    wherein data is prevented from being leaked out from the first data transfer processor by inhibiting the data transfer while the data transfer by the second data transfer processor is available,
    wherein the monitoring is repeated until the data transfer by the first data transfer processor is available,
    wherein the inhibiting of the data transfer of each data transfer processor is performed by rewriting a value in a control register, a function pointer, control or table information of a device corresponding to each data transfer processor, or rewriting a part or the whole of the data related to the data transfer of each data transfer processor,
    wherein canceling of the inhibition of the data transfer is performed by returning the value in the control register to a previous value, by returning the function pointer to a previous status, or by rewriting the control information or the table information to the previous status, wherein the previous value is a value before being rewritten, and the previous status is a status before being rewritten, wherein an inhibition target information further defines the additional program inhibited from being added to the memory, and wherein the inhibiting of the additional program from being added to the memory is performed by referring to the inhibition target information.

6. A non-transitory computer-readable medium storing a program to make a computer including a plurality of data transfer processors execute:

using a first data transmission path by a first data transfer processor only;

using a second data transmission path by a second transfer processor only;

monitoring whether or not a data transfer by the first data transfer processor is available in the plurality of data transfer processors;

inhibiting, based on monitoring, the data transfer of the second data transfer processor while the data transfer by the first data transfer path is available;

storing an additional program to be newly added; and inhibiting the additional program from being added to a memory while the data transfer by the first data transfer processor is available, wherein the first data transfer processor and the second data transfer processor are within the computer, wherein data is prevented from being leaked out from the first data transfer processor by inhibiting the data transfer while the data transfer by the second data transfer processor is available, wherein the monitoring is repeated until the data transfer by the first data transfer processor is available, wherein the inhibiting of the data transfer of each data transfer processor is performed by rewriting a value in a control register, a function pointer, control or table information of a device corresponding to each data transfer processor, or rewriting a part or the whole of the data related to the data transfer of each data transfer processor, wherein canceling of the inhibition of the data transfer is performed by returning the value in the control register to a previous value, by returning the function pointer to a previous status, or by rewriting the control information or the table information to the previous status, wherein the previous value is a value before being rewritten, and the previous status is a status before being rewritten, wherein an inhibition target information further defines the additional program inhibited from being added to the memory, and wherein the inhibiting of the additional program from being added to the memory is performed by referring to the inhibition target information.

* * * * *